H. M. SMITH.
TIRE SUPPORT.
APPLICATION FILED FEB. 27, 1918.
1,343,526.  Patented June 15, 1920.
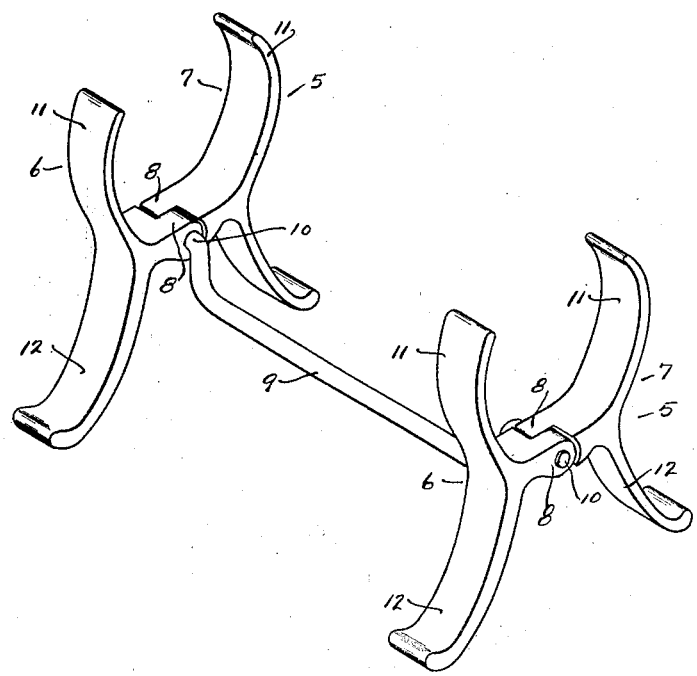
INVENTOR
Herbert M. Smith
BY J. Wm Ellis
ATTORNEY

UNITED STATES PATENT OFFICE.

HERBERT M. SMITH, OF BUFFALO, NEW YORK.

TIRE-SUPPORT.

1,343,526.  Specification of Letters Patent.  Patented June 15, 1920.

Application filed February 27, 1918. Serial No. 219,369.

*To all whom it may concern:*

Be it known that I, HERBERT M. SMITH, a citizen of the United States of America, and a resident of the city of Buffalo, county of Erie, and State of New York, have invented certain new and useful Improvements in Tire-Supports, of which the following is a full, clear, and exact description.

My invention relates generally to supports for automobile tires, and especially to a support for holding a single tire for display purposes.

Some of the objects of my invention are to provide a support which shall firmly grasp the tire and securely hold it in position by its own weight; to provide a support which shall be simple and cheap to manufacture; and one which shall be attractive in appearance.

The above objects have been accomplished by the device shown in the accompanying drawing.

The figure of the drawing is a perspective view of my tire support.

My support comprises preferably two clamps 5, each having a clamping member 6 and a clamping member 7. Each of the members is provided with an inwardly extending lug or arm 8, whereby each pair of members may be pivotally united by a hinge joint. 9 is a supporting or hinge rod which is provided with an offset portion 10 at each end thereof. The function of this offset portion is to provide a space for the annulus, carried by the tire support, whereby the periphery of the annulus will be held away from the hinge rod. The offset portions 10 pass through the lugs 8 of the members 6 and 7, whereby a hinge pin is provided for each pair of members. Each of the members is provided, above the lug 8, with an upwardly extending clamping arm 11, which is, in general, shaped to conform to the tire to be supported. Below the lug 8, each of the members is provided with a rigid leg 12. Each of the legs 12 extends outwardly so as to provide a suitable base for the support.

It will be seen that, owing to the fact that the lower ends of the legs 12 are some distance from the center or pivotal point of the members, when the weight of the tire is bearing upon the support, these legs will be forced outwardly. This action will cause the rigid arms 11 to be pressed inwardly against the sides of the tire whereby it will be firmly held in position. The heavier the tire, the more securely will it be held.

While I have described my invention as one for supporting tires, it clearly could be used as advantageously for supporting any annulus or other weighty object.

Obviously, some modifications of the details herein shown and described may be made without departing from the spirit of my invention or the scope of the appended claims; and I do not, therefore, wish to be limited to the exact embodiment herein shown and described.

Having thus described my invention, what I claim is:

1. A tire support comprising a plurality of clamps, each clamp comprising two clamping members, each provided with an inwardly extending lug, and a hinge rod provided with an offset portion for pivotally uniting each pair of clamping members and connecting each pair of clamps, each of said clamping members having an upwardly extending clamping arm shaped to conform to the tire to be supported, and a downwardly and outwardly extending leg for providing a base for the support.

2. A tire support comprising a plurality of clamps, each clamp comprising two clamping members, each provided with an inwardly extending lug, and a rod having pivotal portions and an intermediate portion between the pivotal portions, the intermediate portion lying in a plane below the axis of the pivotal portions, for connecting the inwardly extending lugs of the clamping members and connecting each pair of clamps, each of said clamping members having an upwardly extending clamping arm shaped to conform to the article to be supported and a downwardly extending leg for providing a base for the support.

In testimony whereof I have hereunto signed my name.

HERBERT M. SMITH.